Dec. 4, 1945.   J. WOGINRICH   2,390,484
CONVERTIBLE VELOCIPEDE
Filed April 20, 1943
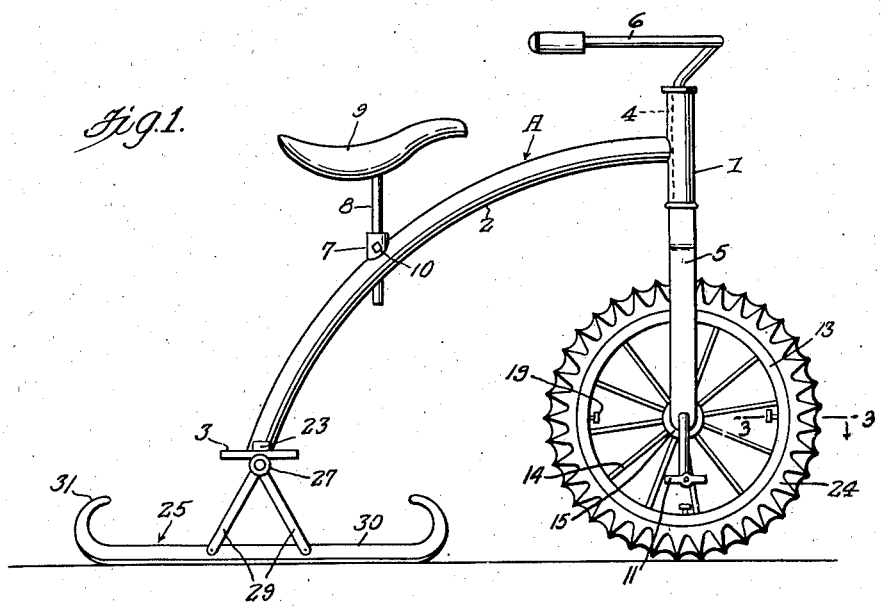
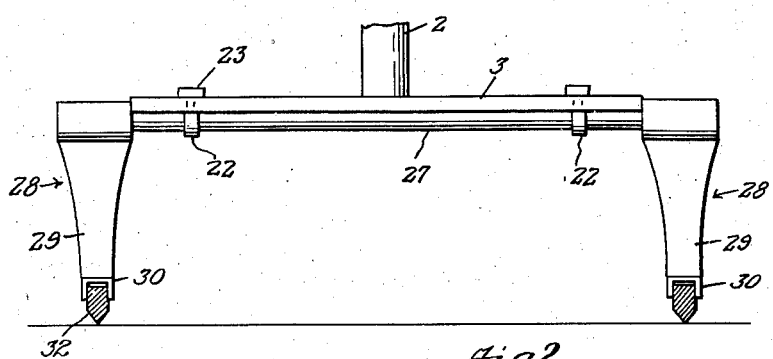
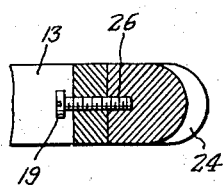
Inventor
Joseph Woginrich
By Clarence A. O'Brien
and Harvey B. Jacobson
Attorneys Patented Dec. 4, 1945

2,390,484

UNITED STATES PATENT OFFICE 2,390,484

CONVERTIBLE VELOCIPEDE

Joseph Woginrich, Walnutport, Pa.

Application April 20, 1943, Serial No. 483,799

1 Claim. (Cl. 280—8)

My invention relates to improvements in velocipedes, the principal object in view being to provide a simply constructed, strong vehicle adapted for easy, quick propulsion over ice or snow and which is not liable to skid.

Other and subordinate objects are also comprehended by my invention, all of which, together with the precise nature of my improvements will be readily understood when the succeeding description and claim are read with reference to the drawing accompanying and forming part of this specification.

In said drawing:

Figure 1 is a view in side elevation of my intion,

Figure 2 is a view in rear elevation drawn to an enlarged scale, and

Figure 3 is a view in transverse section taken on line 3—3 of Figure 1 and drawn to an enlarged scale.

Referring to the drawing by numerals, my improved velocipede comprises, as its basic element, a frame designated as a unit A, and including an upright steering post sleeve 1, a single tubular frame member 2 curving downwardly and rearwardly from said sleeve and upwardly arched, and a broad flat step-forming bolster 3 at the rear end of the frame member 2 extending transversely of said member equi-distantly on both sides thereof, and to which said frame member 2 is suitably connected. A steering post 4 extends through the sleeve 1 and carries at its lower end a steering fork 5, the upper end of said post being equipped with handle bars 6. Substantially midway between the ends of the frame member 2 is a socket 7 for a seat post 8 vertically adjustable in said socket and having suitably mounted on the upper end thereof a seat 9. A set bolt 10 extending through the socket 7 for engagement with the seat post 8 provides for vertical adjustment of the latter into different set positions.

Suitably mounted in the lower ends of the steering fork 5 for propulsion by the usual pedals 11, is a front wheel including a broad flat felly 13, spokes, 14, and a hub 15. The front wheel 12, as will be understood, is removable from the steering fork 5, and any suitable provision may be made adapting the same for such removal.

A heavy spur tread type front wheel tire 24 and a rear runner unit 25 are provided to adapt the velocipede for use on ice or snow. The front wheel tire 24 is designed for attachment to the felly 13 flat against the same by the bolts 19 which screw into sockets 26 provided in said tire 24.

The runner unit 25 comprises a cross rod 27 similar to axle rod 20, a pair of brackets 28 depending from opposite ends of said rod 27 respectively, and each including a pair of downwardly diverging bars 29, a pair of elongated channeled shoes 30 suitably connected intermediate their ends to the pairs of arms 29, and having upturned ends 31, and a pair of sharp edged runners 32 suitably secured in the shoes 30. In substituting the described runner unit for the rear wheel unit 17, the transverse rod 27 of said unit is secured to the bolster 3 by the clip 22 in the same manner as the axle rod 20 of the unit 17, whereby, as will be observed, said runner unit may rock on said bolster 3 about the axis of the rod 27 in travel of the velocipede either forwardly or rearwardly over ice humps and the like, the advantage of which will be manifest.

As will now be seen, my invention provides a wheel-propelled sled which may be easily steered by the propelling wheel. The parts are simple in construction, inexpensive to manufacture and replace, and the invention has many advantages as a toy and is otherwise well adapted to the purposes intended.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

In a velocipede, a frame member inclining downwardly and rearwardly, a broad flat step-forming bolster extending across the lower end of said member, a pedal operative steering wheel mounted on the higher end of said member and having a spur-type tread, a runner assembly comprising a rod extending along the bottom of the bolster, a pair of elongated runners having upturned front and rear ends, a pair of brackets upstanding from said runners intermediate said ends thereof and depending from the ends of said rod, and a pair of clips spanning said rod and extending through said bolster with the nuts threaded thereon.

JOSEPH WOGINRICH.